United States Patent [19]

Nakatomi et al.

[11] Patent Number: 4,551,014
[45] Date of Patent: Nov. 5, 1985

[54] ORIGINAL CARRIER FOR USE WITH AN IMAGE FORMING DEVICE

[75] Inventors: Yoshisugu Nakatomi, Yokohama; Kohachi Uchida, Sagamihara; Shinichi Hashimoto, Fujisawa, all of Japan

[73] Assignee: Tokyo Shibaura Denki Kabushiki Kaisha, Japan

[21] Appl. No.: 694,482

[22] Filed: Jan. 24, 1985

Related U.S. Application Data

[63] Continuation of Ser. No. 550,999, Nov. 15, 1983, abandoned, which is a continuation of Ser. No. 302,598, Sep. 15, 1981, abandoned.

[30] Foreign Application Priority Data

Oct. 28, 1980 [JP] Japan .................. 55-151270

[51] Int. Cl.⁴ .............................. G03B 27/62
[52] U.S. Cl. ........................... 355/75; 355/8
[58] Field of Search ............ 355/8, 75, 3 SH, 14 SH

[56] References Cited

U.S. PATENT DOCUMENTS

| | | | |
|---|---|---|---|
| 3,740,131 | 6/1973 | Hirose | 355/75 |
| 3,993,406 | 11/1976 | Zeuthen | 355/75 |
| 4,129,374 | 12/1978 | Uchida et al. | |
| 4,171,901 | 10/1979 | Takizawa et al. | 355/8 |
| 4,190,349 | 2/1980 | Ohno et al. | 355/8 |
| 4,204,735 | 5/1980 | Opravil | 355/75 |
| 4,297,023 | 10/1981 | Nagoshi | 355/8 |
| 4,348,106 | 9/1982 | Suzuki et al. | 355/75 |

Primary Examiner—Monroe H. Hayes
Attorney, Agent, or Firm—Banner, Birch, McKie & Beckett

[57] ABSTRACT

In the original carrier according to the present invention, two spaced supporters are fixed to the glass plate along one of its sides for supporting and reinforcing the glass and the cover. Guide members are mounted on each side of the copier which slidably receive the glass and supporters to permit their reciprocal movement. One guide member receives one edge of the glass while the other receives the supporter. The supporters and glass plate reciprocally move along the guide members to permit the copying action.

9 Claims, 8 Drawing Figures

ORIGINAL CARRIER FOR USE WITH AN IMAGE FORMING DEVICE

This application is a continuation of application Ser. No. 550,999 filed 11-15-83 which is a continuation of application Ser. No. 302,598 filed 9-15-81 both now abandoned.

BACKGROUND OF THE INVENTION

This invention relates to an original carrier for use with an image forming device for holding an original document or other item to be copied by the device. The invention is particularly directed to use with a reciprocative type image forming device.

Recently, there has been a demand for miniaturization of copying machines. To meet this demand, a reciprocating original carrier has been developed. An example of this conventional holder is shown in FIG. 1. As shown, a heavy metal plate frame 3 is reciprocally moved on guide rails (not shown) provided on the upper portion of the copying machine's main body 1. A square opening 6 is provided on frame 3 and a glass plate 4 is attached within the opening. A cover 2, positioned at one end of frame 3, is mounted through hinge 5 so that it can be easily opened and closed to retain the original. Prior to copying, cover 2 is raised so that the original can be positioned, image side down, on glass plate 4. The cover is then closed and frame 3 begins reciprocating in the direction shown by operation of a proper drive member.

In this conventional design, frame 3 must support glass plate 4 and cover 2. Consequently, frame 3 must have a rigidity and weight to permit such support while continuous reciprocative action occurs. As a result, it has been necessary to employ a fairly heavy frame which, concomitantly requires a large driving force to produce the reciprocative action. Further, the drive system must be designed to accomodate this additional force while requiring additional components for effective operation. A further disadvantage is that due to the necessary usage of frame 3, compactness is not provided. The presence of a frame surrounding glass plate 4 necessarily limits the size of the holder. In addition, the fabrication of such carriers are complex requiring a number of parts.

Some prior art reciprocative type copying machines having a metal frame along one side does not overcome these problems. The design shown in U.S. Pat. No. 4,129,374, for example, utilizes a metal U-shaped frame fixed to one side of the glass plate. This design, however, also requires the use of a cover frame which is fixed to the metal frame. This design, therefore, requires the use of a heavy drive system to accomodate the metal frame and the cover frame.

SUMMARY OF THE INVENTION

This invention overcomes the prior art disadvantages mentioned above. The invention provides an original carrier for an image forming device which is rigid and strong, while having a simple construction, a small number of parts, and lightness in weight.

Another object of the invention is to provide an original carrier which can be smoothly reciprocated by a small driving force.

A further object of the invention is to provide an original carrier permitting compactness and miniaturization.

A still further object of this invention is to provide an original carrier which can be fabricated at low cost whole providing high reliability.

In the original carrier according to the present invention, two spaced supporters are fixed to the glass plate along one of its sides for supporting and reinforcing the glass plate and the cover. Guide members are mounted on each side of the copier which slidably receive the glass and supporters to permit their reciprocal movement. One guide member receives one edge of the glass while the other receives the supporter. The supporters and glass plate reciprocally move along the guide members to permit the copying action.

The original carrier of the present invention utilizes only the glass plate for supporting the original; no additional reinforcing material is required. Therefore, there is a reduction in number of carrier parts, the weight of the copier, and the weight and complexity of the drive system.

Further, if reinforced glass is used for the glass plate, the holes used for suspending this glass during fabrication can be used as the mounting holes for the supporters. Therefore, it is unnecessary to drill additional mounting holes to the glass plate; consequently, the copier manufacturing process can be simplified.

Moreover, the mere use of two supports, mounted to the glass plate for providing the requisite support for the glass and cover, simplifies the copier construction, weight, and production cost.

Other objects and features of the present invention will be apparent from the following description taken in connection with the accompanying drawings.

DETAILED DESCRIPTION OF THE PREFERRED EMBODIMENTS

While reference is made in the present application to a copying machine, it should be clear that the present invention can be employed with any image forming device (e.g., facsimile machines).

Figure 1:
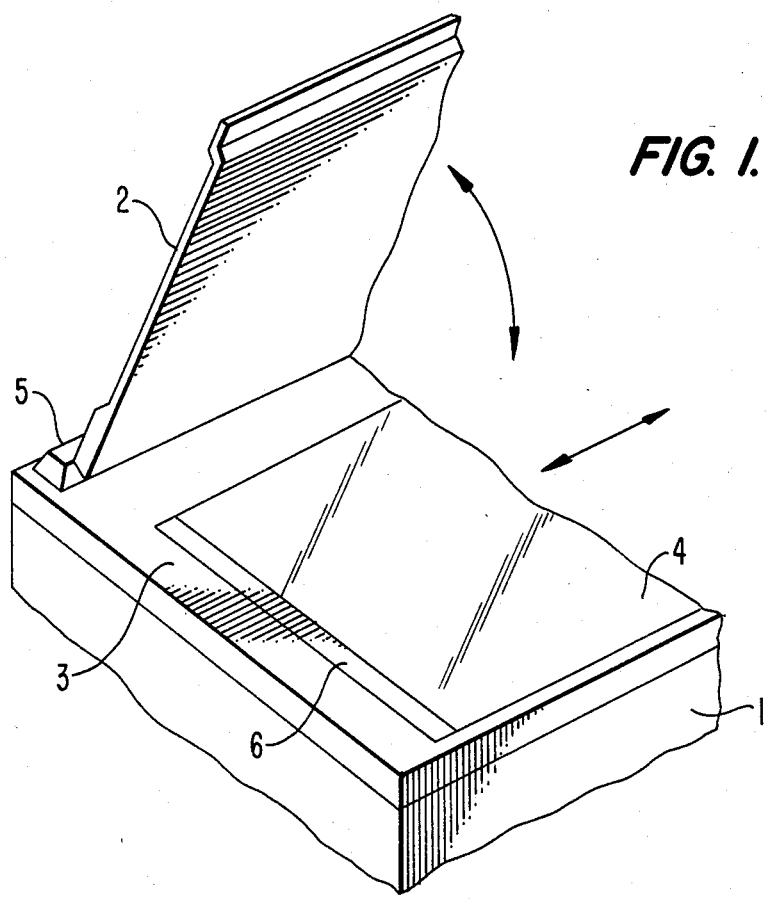
FIG. 1 is a perspective view of a prior art according to conventional technology.
Figure 2:
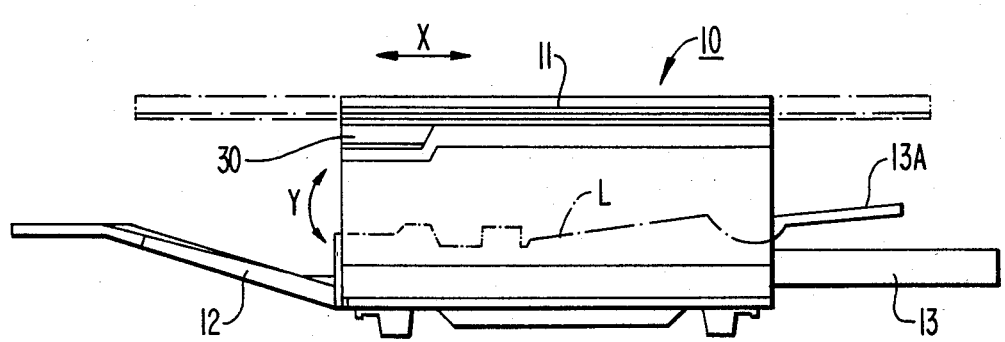
FIG. 2 is a side elevation of a prior art copier.

As shown in FIG. 2, an original carrier 11 in a copying machine 10 is designated to freely reciprocate in the X direction by a drive mechanism (not shown). A more detailed discussion of the remaining parts shown in FIG. 2 will be made with reference to FIG. 3.

Figure 3:
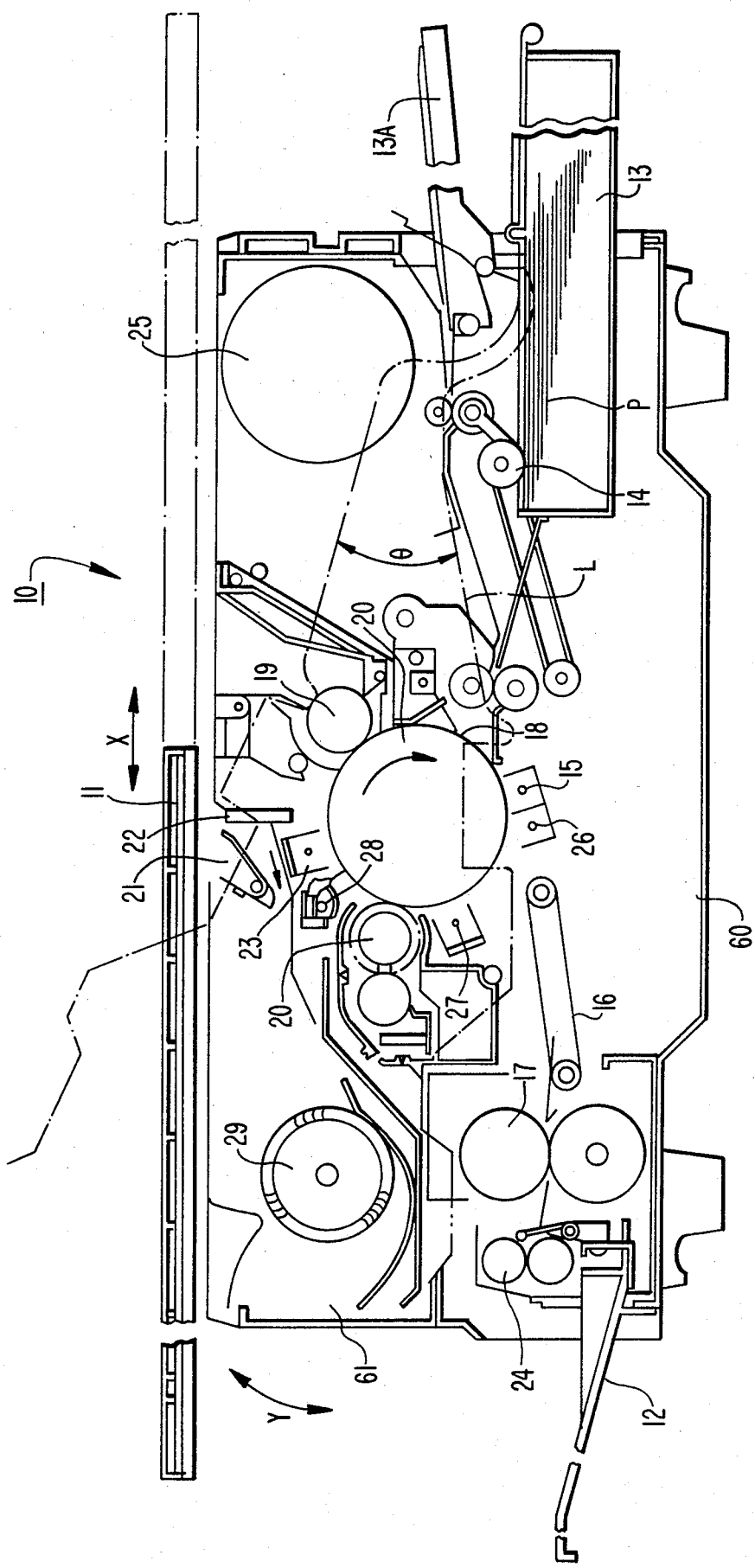
FIG. 3 is an enlarged longitudinal sectional view of the copying machine shown in FIG. 2.

As shown in FIG. 3, a tray 12 is removably mounted on the left side of copying machine 10. A cassette 13 for storing copying papers P and a manual feed guide member 13A for manually feeding papers are provided on the right side. A paper supplying mechanism 14 is coupled to cassette 13 and guide member 13A for feeding papers stored in the cassette 13 and feed guide member 13A. A transfer mechanism 15 transfers the developer (i.e., toner) from a photosensitive member 18 to copying paper P. Transportation mechanism 16 transports the transferred copying paper P to a fusing mechanism 17 for fusing transferred toner on the paper.

Photosensitive member 18 comprises a selenium drum which is rotatably mounted. Spaced around photosensitive member 18 are the following units: a developer unit 19 for storing toner; a cleaning device 20 for cleaning the residual toner from photosensitive member 18; an illuminating system 21 for illuminating the original carried by an original carrier 11; a focusing light transmitter 22 for transmitting reflected illumination from the original to photosensitive member 18; and, a charger 23 for uniformly charging the static charge on photosensitive member 18. Further, several additional elements are spaced around photosensitive member 18: a paper separator 26 which causes corona discharge to separate the copying paper P; a discharger 27 for removing the charge from photosensitive member 18 after it has transferred the image copying paper P; and, an exposure lamp 28 for uniformly illuminating photosensitive member 18 before charging. In addition, there is provided a transportation roller 24 for transporting the fused copying paper P to copy receiving tray 12 and a motor 25 for reciprocally moving original carrier 11 and rotating photosensitive member 18. Also shown is a cooling device 29 for cooling the fusing mechanism 17.

As shown in FIGS. 2 and 3, the copying machine is constructed of two units, an upper unit 61 and a lower unit 60. By rotating an operational panel 30, these units can be unlocked. The upper unit can be raised upwardly to a desired angle (for example, 25°) in the direction of arrow Y, pivoting about pivot or hinge 62 (see FIG. 3). The upper and lower units are separated along line L (see FIGS. 2 and 3). Therefore, paper P can be easily removed if it becomes jammed along the transportation path.

The copying machine 10 operates as follows. The original is placed, with the image to be copied downward, on the original carrier 11. The original is then illuminated by illumination system 21 and the reflected light, focused by transmitter 22, forms an electrostatic latent image of the original pattern on the surface of photosensitive member 18. In the meantime, paper P is singularly removed from cassette 13, paper supply mechanism 14, and is guided to the lower part of photosensitive member 18. The electrostatic latent image of the original pattern on drum 18 is developed by the toner in developer unit 19. The developed image is then transferred onto sheet P by transfer mechanism 15. Paper P is then guided to fusing mechanism 17 via transportation mechanism 16. After fusing, the paper is discharged onto tray 12 by the action of transportation roller 24. After transfer is completed, the photosensitive member 18 is cleaned by discharger 27 and cleaning device 20 and is then positioned adjacent charger 23 for recharging and receiving the next image.

Figure 4:
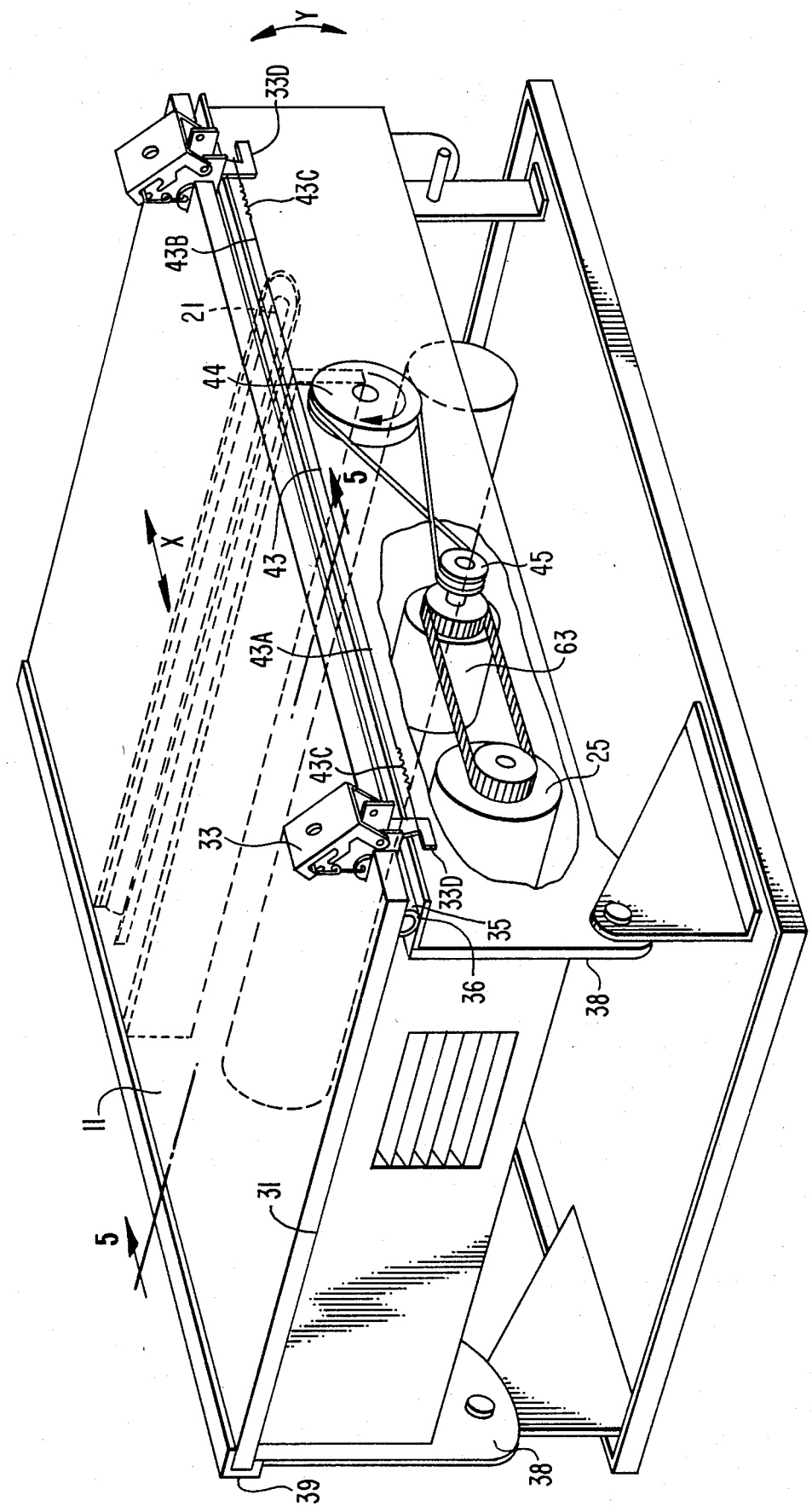
FIG. 4 is a perspective view of a copying machine utilizing on the original carrier according to the present invention.
Figure 5:
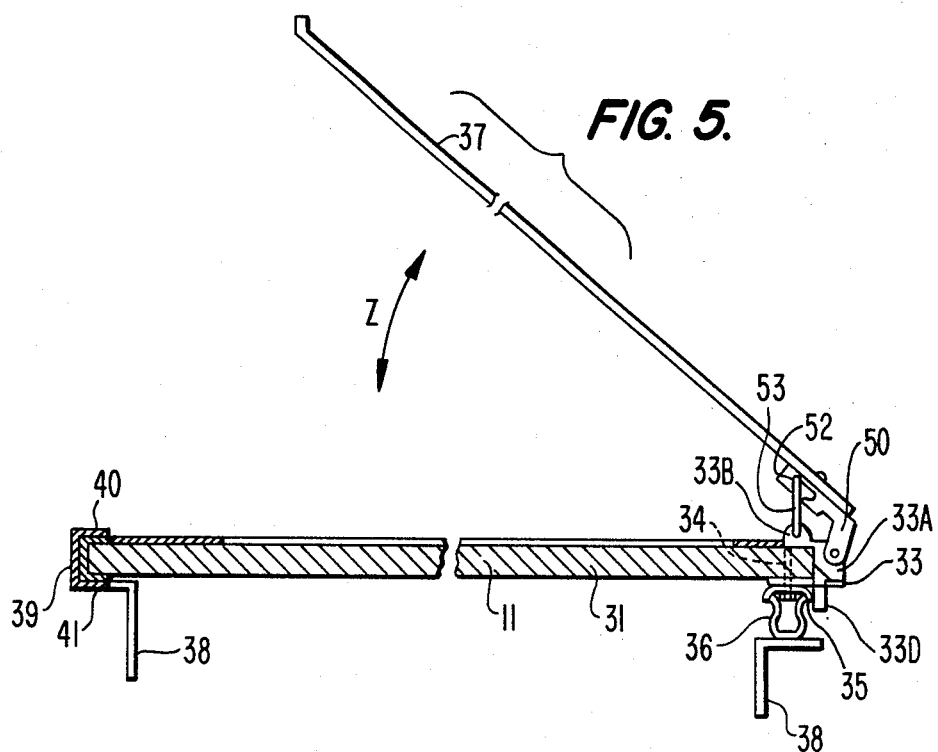
FIG. 5 is a sectional view of the original carrier shown in FIG. 4 taken along line 5—5 of FIG. 4.
Figure 6:
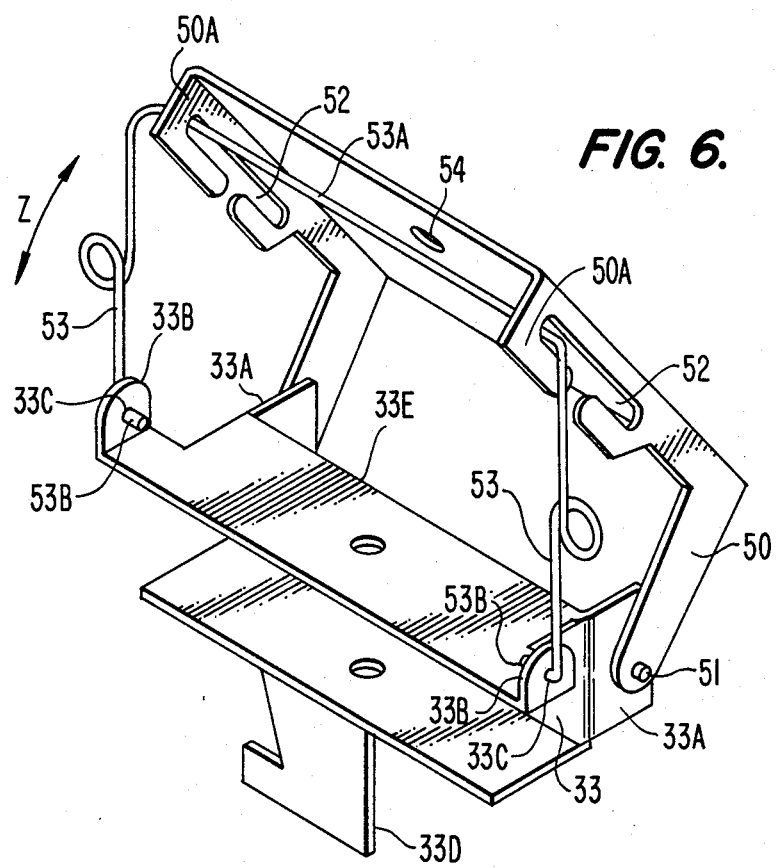
FIG. 6 is a perspective view of a supporter shown in FIG. 4.

As shown in FIGS. 4 to 6, the original carrier 11 is modified by being provided with a reinforced transparent glass plate 31 (hereinafter referred to as glass plate). A pair of spaced holes 32 are formed on one side of the glass plate 31. These holes 32 can be formed by drilling through a standard flat glass plate. However, a reinforced glass plate manufactured by heat treatment can be utilized. Such a reinforced plate has spaced holes which are used for suspending the glass during fabrication; these holes can then be used for mounting the supporters, as will be discussed below, without the need for drilling.

Two spaced supporters 33, having a U-shaped section, are each mounted at one end of carrier 11 on one side of plate 31 by fastener 34 (e.g., screw, etc.) through these holes. At the lower part of supporter 33, an upper guide member 35 is positioned. Guide member 35 extends along the substantial length of glass plate 31. Upper guide member 35 is slidably mounted with respect to a lower guide member 36 having substantially the same length and orientation as guide member 35. Upper guide member 35 fits over and slides on a track of lower guide member 36. Guide member 36 is mounted to the upper portion of frame 38 of copying machine 10. A base portion 33E of supporter 33 is bent on both ends to form a pair of hinge tabs 33A. A hinge member 50 is pivotally attached, by hinge pin 51, to tabs 33A to permit pivotal movement along the direction of arrow Z. Hinge member 50 has spaced downwardly turned flanges 50A, each having a spring slot 52. Slots 52 together receive a central portion 53A of spring member 53. Spring member 53 has ends 53B which are received in upwardly oriented apertured spring tabs 33B carried by base portion 33E. Cover 37 is mounted to hinge member 50 by use of a fastener 37a, through holes 54 in hinge members 50. The supporters not only hingedly attaches cover 37 to plate 31, but also provides additional reinforcement and rigidity for the glass plate. Also, at the lower portion of base portion 33E, drive hooks 33D are provided to receive a wire 43 (see FIG. 4) for coupling to the drive system.

The other side of glass plate 31 is slidable in a channel formed by a U-shaped guide member 41. Member 41 is constructed by bending the upper end of frame 38 in a U-shaped configuration. Member 41 extends along the entire width of the copying machine 10 and the channel is lined with Mylar tape 39 to facilitate sliding of the glass plate.

As shown in FIG. 4, drive hook 33D of one supporter is connected to the lower part of one end 43A of drive wire 43 while the drive hook 33D of the other supporter is connected to the other end 43B of drive wire 43. As shown, the intermediate portion of wire 43 is wound around pulleys 44 and 45 in a figure eight configuration. Pulley 45 is designed to rotate forward and backward by the action of a drive system comprising motor 25 and reciprocal clutch 63. The rotation of pulley 45 forward and backward moves the wire in a reciprocating manner. As a result, glass plate 31 and supporters 33 are reciprocated in the direction of arrow X. Springs 43C are disposed between each end 43A, 43B of the wire and hook 33D to absorb shocks.

Figure 8:
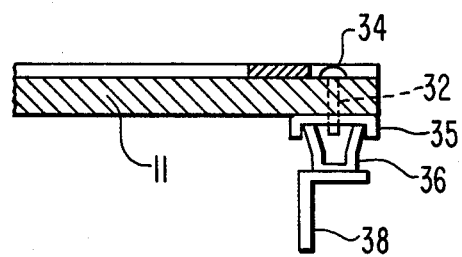
FIG. 8 is a sectional view of another embodiment of the original carrier according to the present invention.

If it is desired not to utilize cover 37, as shown in FIG. 8, the upper guide member 35 may be fixed by inserting plate 31 by a fastener 34 positioned through the hole 32 of glass plate 31 without the need of supporters 33. In this embodiment, fastener 34 performs a function similar to that performed by supporter 33. This construction permits even a further reduction in the weight of the original carrier, with an accompanying reduction in the necessary driving force.

Figure 7:
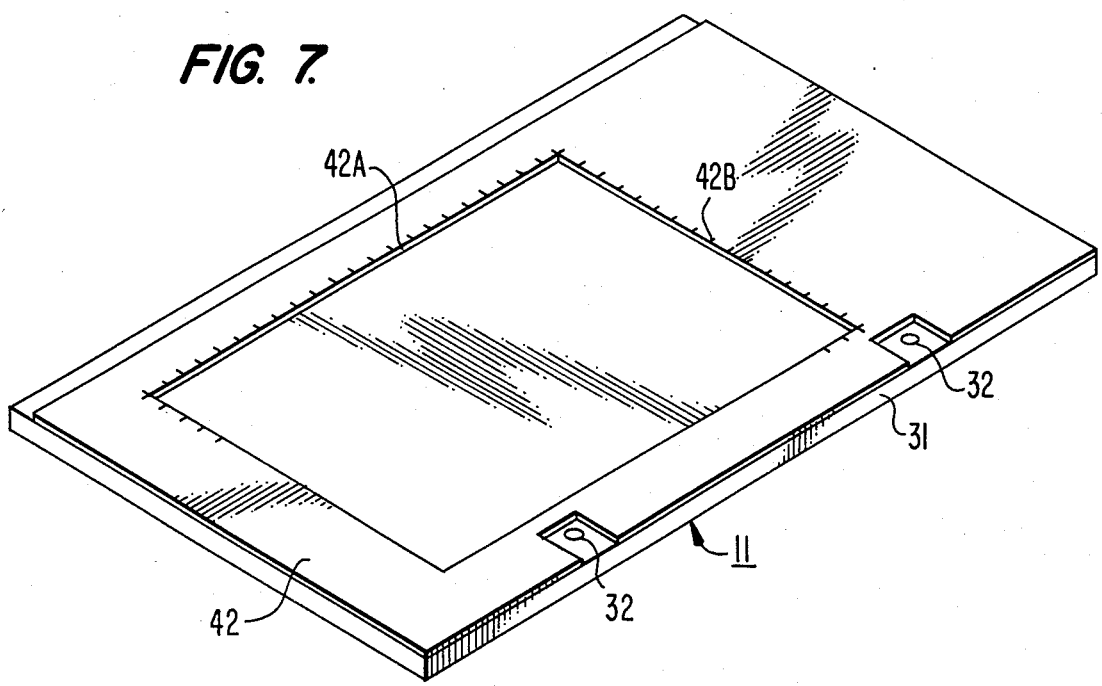
FIG. 7 is a perspective view showing a plastic scale plate which is mounted on the glass plate.

On the upper surface of glass plate 31, a plastic scale plate 42 is positioned, as shown in FIG. 7. Scale plate 42 contains an opening 42A having scale lines 42B. The scale plate 42 is constructed to permit access to only those portions of the glass plate where reproduction can occur.

When an operator pulls the original cover 37 upwardly, hinge member 50 rotates against the force of spring 53 in the direction Z (see FIG. 6). When the hinge member 50 is positioned above the dead-center point of spring 53, (i.e., the position where pins 51 in the side tabs 33A, holes 33C of the spring tabs 33B, and the upper ends of slots 52 of the hinge member 50 are aligned) the cover is forced upwardly by the force of spring 53. As a result, cover 37 is held in an open position permitting access to glass plate 31. Once the original is positioned within opening 42A of scale plate 43, the cover 37 is pushed downwardly to a position beyond the dead-center point of spring 53. After that point, cover 37 is closed by the force of spring 53 and the original is depressed against glass plate 31 for proper copying. Upon activating the copying machine, pulley 45 rotates a first direction (i.e., clockwise). Consequently, end 43A of wire 43 is pulled to the right which results in moving the glass plate at the fixed speed in one direction along the guide members 41 and 36. Plate 31 thereby moves to an extended position. As glass plate 31 moves, the image of the original is projected, via focusing lens 22, on the surface of photosensitive member 18 to form a recessive electrostatic latent image. The electrostatic latent images thus formed are developed by the developer unit 19 to form a visible image. This visible image is transferred onto copying paper P through transfer mechanism 15. The transferred copying paper P is transported, by transportation mechanism 16, to fusing mechanism 17 and is then discharged into the tray 12 by the transportation roller 24.

A leading edge detector (not shown) detects if the original carrier 11 has moved the length of the original. In that case, the reciprocal clutch 63 reverses to begin rotation of pulley 45 in a reverse direction. As a result, end 43B of wire 43 is moved to the left whereby glass plate 31 is moved to its retracted position to commence another copying operation. This retracted position is detected by a trailing end detector (not shown).

Since obvious changes may be made in the illustrated embodiment of the device without departing from the scope of the invention, it is intended that all matter contained herein be interpreted as illustrative and not in a limiting sense.

We claim:

1. In an image forming device having a reciprocating original carrier and a body frame, said original carrier comprising: (a) a glass plate having an upper surface for receiving said original and a lower surface, said glass plate having at least one hole arranged along a longitudinal edge of said glass plate, (b) a first and second guide member each mounted on opposite sides of said body frame for slidably receiving said glass plate to permit its reciprocal movement, (c) cover means hingedly attached to said glass plate for permitting access to said upper surface of said glass, and (d) means for driving said glass plate to cause such reciprocal movement, the improvement comprising: said first and second guide members and said driving means being mounted substantially within the boundaries of said lower surface of said glass plate, wherein at least one of said guide members is mounted directly below said lower surface and has an upper guide element attached along said longitudinal edge of a lower surface of said plate by a fastener through said hole and a lower guide element attached to said body frame, wherein said upper guide element is slidably mounted with respect to said lower guide element and at least one support member being mounted along said longitudinal edge of said glass plate by said fastener, said support member including means for hingedly attaching said cover means to said glass plate.

2. The image forming device of claim 1 further comprising a plurality of support members mounted on the upper surface of said glass plate along said longitudinal edge for reinforcing said plate, each of said support members including means for hingedly attaching said cover means to said plate wherein the combined length of said plurality of support members along said longitudinal edge is substantially less than the length of said longitudinal edge.

3. The image forming device of claim 2 wherein said glass plate further comprises a plurality of spaced holes along said longitudinal edge through which said plurality of support members are mounted on the upper surface of said plate and said upper guide element is attached to the lower surface of said plate.

4. The image forming device of claim 3, wherein said glass plate is reinforced glass plate and said plurality of holes are used for suspending said plate during its fabrication.

5. The image forming device of claim 2 wherein said hinge means is pivotally attached by a hinge pin to said support member to permit pivotal movement of said cover with respect to said glass plate, overcenter spring means received in said support member and means for maintaining said cover substantially open with respect to said glass plate when said cover is raised above a first predetermined position and maintaining said cover substantially closed with respect to said glass plate when said cover is lowered below a predetermined second position.

6. The image forming device of claim 5 wherein said overcenter spring means comprises a torsion spring, the overcenter point of said overcenter spring means being formed when said hinge pin, the spring receiving point of said support member and the spring receiving point of said hinge means are aligned.

7. The image forming device of claim 2 wherein at least one of said support members further comprises a drive hook which is operatively connected to said driving means for causing the reciprocal movement of said plate.

8. The image forming device of claim 1, wherein the width of said glass plate is substantially the same as the width of said body frame, said body frame comprising an upper surface to which said lower guide element is mounted.

9. The image forming device of claim 1, further comprising a scale plate mounted on the upper surface of the glass plate.

* * * * *